United States Patent
Sachson et al.

(10) Patent No.: US 12,508,511 B2
(45) Date of Patent: *Dec. 30, 2025

(54) MANAGING ACCESS TO DIGITAL ASSETS

(71) Applicants: Sony Group Corporation, Tokyo (JP); Sony Music Entertainment, New York, NY (US)

(72) Inventors: Thomas Sachson, Malibu, CA (US); Bradley Spahr, Redondo Beach, CA (US)

(73) Assignees: SONY GROUP CORPORATION, Tokyo (JP); SONY MUSIC ENTERTAINMENT, New York, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/395,262

(22) Filed: Aug. 5, 2021

(65) Prior Publication Data

US 2021/0362060 A1     Nov. 25, 2021

Related U.S. Application Data

(63) Continuation-in-part of application No. 16/684,984, filed on Nov. 15, 2019, now abandoned.

(Continued)

(51) Int. Cl.
*A63F 13/69* (2014.01)
*A63F 13/79* (2014.01)
(Continued)

(52) U.S. Cl.
CPC .............. *A63F 13/69* (2014.09); *A63F 13/79* (2014.09); *G06F 16/635* (2019.01);
(Continued)

(58) Field of Classification Search
CPC .... A63F 13/69; A63F 13/79; A63F 2300/609; G06F 16/687; G06F 16/635; G06F 16/638; G06F 16/64
See application file for complete search history.

(56) References Cited

U.S. PATENT DOCUMENTS

2001/0034635 A1   10/2001   Winters
2006/0031257 A1    2/2006   Lipscomb
(Continued)

FOREIGN PATENT DOCUMENTS

CN        106302678 A       1/2017
CN        106339504 A       1/2017
(Continued)

OTHER PUBLICATIONS

Gosu No0b, "Nassau Shanties Locations Guide", Oct. 29, 2013 Originally Retrieved from (https://www.gosunoob.com/ac4-black-flag/nassau-shanties-locations-guide/) on May 21, 2021 (Year: 2013).*

(Continued)

*Primary Examiner* — Robert E Mosser
(74) *Attorney, Agent, or Firm* — Procopio, Cory, Hargreaves & Savitch LLP

(57) ABSTRACT

Managing access to digital content at a server system in communication with relevant gaming devices, including: receiving a user account identifier and performance information from a relevant gaming device; accessing a collectible database storing collectible records; comparing the received performance information with the performance information in the collectible records; accessing a user account database that stores user account records; adding the retrieved collectible identifier to the identified user account record; retrieving a music-related asset identifier from the identified collectible record; and sending a confirmation to the relevant gaming device that indicates the collectible (Continued)

asset has been collected and indicates the retrieved music-related asset identifier.

16 Claims, 5 Drawing Sheets

Related U.S. Application Data

(60) Provisional application No. 63/061,450, filed on Aug. 5, 2020.

(51) Int. Cl.
    *G06F 16/635*     (2019.01)
    *G06F 16/638*     (2019.01)
    *G06F 16/64*     (2019.01)

(52) U.S. Cl.
    CPC ............ *G06F 16/638* (2019.01); *G06F 16/64* (2019.01); *A63F 2300/609* (2013.01)

(56) References Cited

U.S. PATENT DOCUMENTS

| | | |
|---|---|---|
| 2008/0270240 A1 | 10/2008 | Chu |
| 2009/0197684 A1 | 8/2009 | Arezina |
| 2012/0289343 A1 | 11/2012 | Pokonosky |
| 2014/0131434 A1 | 5/2014 | Ozkan |
| 2015/0024852 A1 | 1/2015 | Pacey et al. |
| 2017/0127128 A1 | 5/2017 | Seger |
| 2018/0036641 A1 | 2/2018 | Parisi |
| 2018/0158036 A1 | 6/2018 | Zhou |
| 2018/0349703 A1 | 12/2018 | Rathod |
| 2019/0081947 A1 | 3/2019 | Faris |

FOREIGN PATENT DOCUMENTS

| | | |
|---|---|---|
| CN | 107690815 A | 2/2018 |
| TW | 201342282 A | 10/2013 |
| WO | 2016032985 A1 | 3/2016 |

OTHER PUBLICATIONS

Jamie Sharp, "Assassin's Creed Black Flag Shanties | A Pirate's Guide", Jan. 22, 2021, Originally Retrieved from (https://thecenturionreport.com/assassins-creed-black-flag-shanties-a-pirates-guide/) on May 21, 2021 (Year: 2021).*

Wikipedia encylopedia "Assassin's Creed IV: Black Flag" Last Edited Mar. 18, 2021, Originally Retrieved from (https://en.wikipedia.org/wiki/Assassin's_Creed_IV:_ Black_Flag) on May 21, 2021 (Year: 2021).*

The 7th time ***, Inc.*, "Cellular phone image practical use way of a superior site", telecommunication, the CO. LTD.RIC telecom, Sep. 25, 2002, vol. 19 No. 10, pp. 20-21.

Paul Vhayste "Shanties", Jan. 17, 2014, p. 1-2, www.supercheats.com/assassin-s-creed-4-black-flag/walkghrough/shanties.

* cited by examiner

MANAGING ACCESS TO DIGITAL ASSETS

CROSS-REFERENCE TO RELATED APPLICATIONS

The present application is a continuation-in-part application of co-pending U.S. patent application Ser. No. 16/684,984 (filed Nov. 15, 2019). This application also claims the benefits of priority under 35 U.S.C. § 119(e) of U.S. Provisional Patent Application No. 63/061,450, filed Aug. 5, 2020, entitled "Managing Access to Digital Assets". The disclosure of the above-referenced application is incorporated herein by reference.

BACKGROUND

Field

The present disclosure relates to managing digital assets, and more specifically, to managing digital assets for a musically-themed digital asset collection game.

Background

Computer-implemented games such as PC, gaming console, table, mobile phone, or any other analogous device-based games are increasingly popular, and new uses for the technology are constantly being found. The software may be tied to certain real or virtual-world geolocations.

SUMMARY

The present disclosure provides for managing and collecting digital assets using "performance information" and using the assets to access additional assets.

In one implementation, a system for managing access to digital content is disclosed. The system includes: a music database storing music assets as music data and music asset identifiers for each music asset, wherein the music assets include music-related assets; a collectible database storing collectible records for collectible assets, wherein a collectible record includes data indicating a collectible identifier, a collectible type, a music asset identifier for a music asset associated with the collectible asset, a representation for the collectible asset, and performance information associated with the collectible asset; a user account database storing user account records for users, wherein a user account record includes data indicating an identifier for a user, and a list of collectible identifiers of collectible assets collected by the user; and a processor configured to receive a user account identifier and performance information from the relevant gaming device, to compare the received performance information with the performance information in the collectible records, to identify a collectible record that has the performance information matching the received performance information, to retrieve a collectible identifier for the identified collectible record, to identify a user account record matching the received user account identifier, and to add the retrieved collectible identifier to the identified user account record.

In one implementation, the performance information associated with the collectible asset includes a virtual location of the collectible asset as that asset resides within the game's virtual environment/world. In one implementation, the performance information associated with the collectible assets includes at least one of completing actions, being at a virtual coordinate or virtual geolocation, spending an amount of time at a virtual coordinate or virtual geolocation, being at a virtual coordinate or virtual geolocation, under set conditions, and performing actions at a virtual coordinate or virtual geolocation digitally on or through such relevant gaming device. In one implementation, the music-related assets comprise songs, albums, playlists, video, programs, movies, games, and virtual reality (VR) experiences. In one implementation, the collectible identifier includes an image file. In one implementation, the identifier for the user includes at least one of an email address, a user game long-in credential, or a mobile device number.

In another implementation, a method for managing access to digital content at a server system in communication with the relevant gaming devices is disclosed. The method includes: receiving a user account identifier and performance information from the relevant gaming device; accessing a collectible database storing collectible records including performance information for collectible assets and music-related asset identifiers for music-related assets; comparing the received performance information with the performance information in the collectible records; identifying a collectible record that has performance information matching the received performance information; retrieving a collectible identifier for the identified collectible record; accessing a user account database that stores user account records including user account identifiers and collectible identifiers indicating collectible assets collected by a user account; identifying a user account record matching the received user account identifier; adding the retrieved collectible identifier to the identified user account record to indicate the user account has collected the collectible asset associated with the retrieved collectible identifier; accessing a music database that stores music-related assets as digital data and music-related asset identifiers that correspond to respective music-related assets; retrieving a music-related asset identifier from the identified collectible record; and sending a confirmation to the relevant gaming device that indicates the collectible asset has been collected and indicates the retrieved music-related asset identifier.

In one implementation, the music-related assets comprise songs, albums, playlists, video, programs, movies, games, and VR experiences. In one implementation, the method further includes receiving a request from the relevant gaming device to access a song represented by a music-related asset, where the request includes the retrieved music-related asset identifier. In one implementation, the method further includes identifying the music-related asset in the music database that corresponds to the retrieved music asset identifier. In one implementation, the method further includes sending the digital data corresponding to the identified music-related asset to the relevant gaming device for playback of the song by processing the sent digital data at the relevant gaming device. In one implementation, the performance information for the collectible assets includes virtual in-game coordinate and virtual geolocation information for the collectible assets. In one implementation, the performance information for the collectible assets includes at least one of completing actions, being at a virtual coordinate or virtual geolocation, spending an amount of time at a virtual coordinate or virtual geolocation, being at a virtual coordinate or virtual geolocation under set conditions, and performing actions at a virtual coordinate or virtual geolocation digitally. In one implementation, the method further includes enabling the relevant gaming device to access the music-related asset when the confirmation is received by the relevant gaming device. In one implementation, the method further includes creating image representations of the collectible assets. In one implementation, the method includes enabling the relevant gaming device to share information about the collectible assets. In one implementation, sharing information about the collectible assets includes sending images or information about an experience of collecting the collectible assets. In one implementation, the further includes sending collecting points or environment currency, and associated titles or other environment privileges for collecting the collectible assets. In one implementation, the collectible assets include interactive representations with an animated objects or characters.

In another implementation, a non-transitory computer-readable storage medium storing a computer program to manage access to digital content at a server system in communication with the relevant gaming devices is disclosed. The computer program includes executable instructions that cause a computer to: receive a user account identifier and performance information from a relevant gaming device; access a collectible database storing collectible records including performance information for collectible assets and music-related asset identifiers for music-related assets; compare the received performance information with the performance information in the collectible records; identify a collectible record that has performance information matching the received performance information; retrieve a collectible identifier for the identified collectible record; access a user account database that stores user account records including user account identifiers and collectible identifiers indicating collectible assets collected by a user account; identify a user account record matching the received user account identifier; add the retrieved collectible identifier to the identified user account record to indicate the user account has collected the collectible asset associated with the retrieved collectible identifier; access a music database that stores music-related assets as digital data and music-related asset identifiers that correspond to respective music-related assets; retrieve a music-related asset identifier from the identified collectible record; and send a confirmation to the relevant gaming device that indicates the collectible asset has been collected and indicates the retrieved music-related asset identifier.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1:
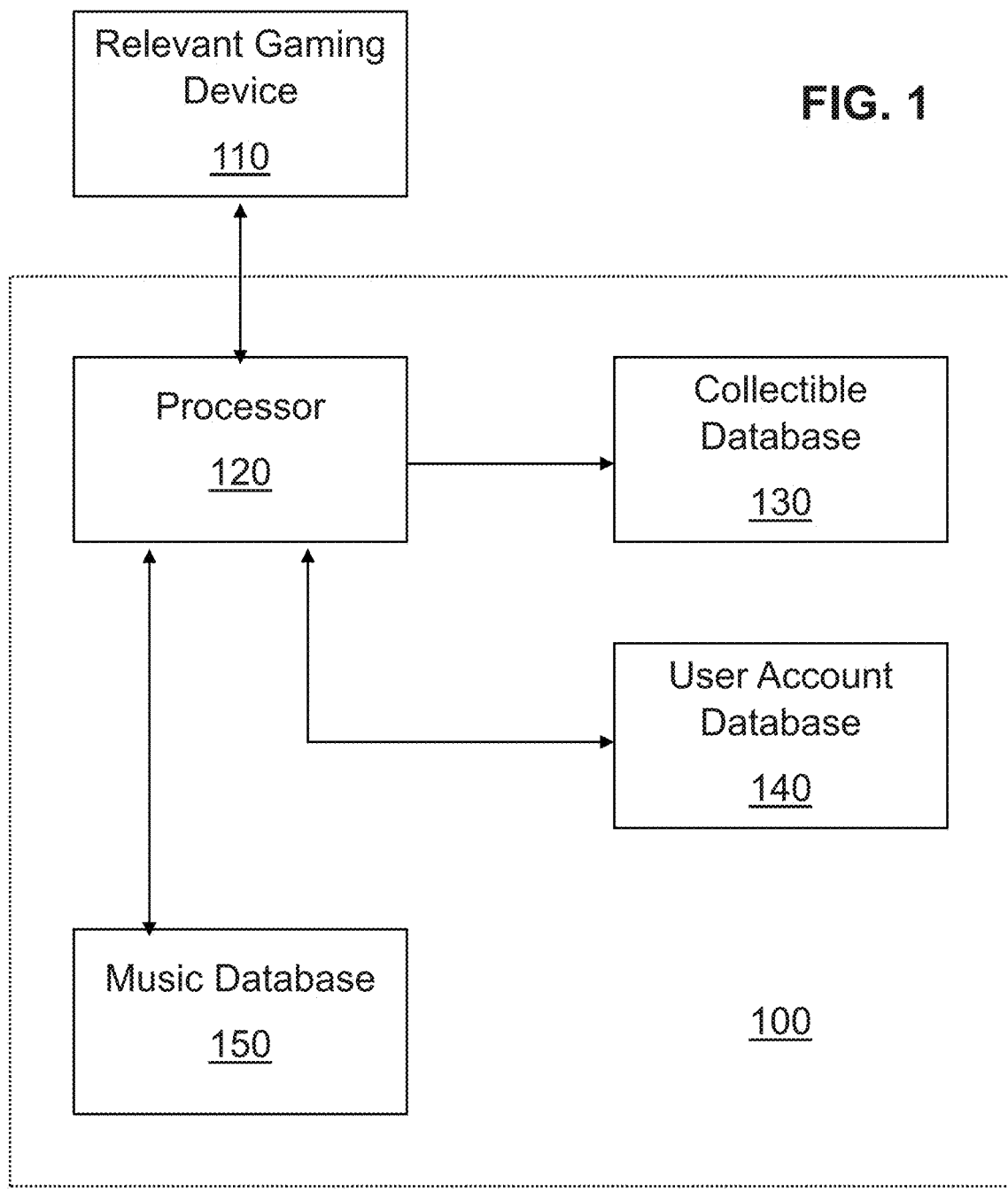
FIG. 1 is a block diagram of system for managing access to digital content in in accordance one implementation of the present disclosure.

As described above, computer-implemented games residing upon relevant gaming device systems, such as those referred to above, are increasingly popular, and new uses for the technology are constantly being found. The software may be tied to certain virtualized in-game world geolocations or virtualized in-game world coordinates. Further, if the software is a video game, for example, participants may use such virtualized in-game world geolocations or virtualized in-game world coordinates to compete against other participants in a game, which may include managing and collecting digital assets.

Certain implementations of the present disclosure provide for managing and collecting digital assets using in-world virtualized geolocation or in-world virtualized coordinate information and using the assets to access additional assets. In one implementation, a computer system implements a music-themed "scavenger hunt" game that allows users to discover, track, and capture limited and unlimited supply of digital music and digital non-music assets in the virtualized in-game world utilizing virtualized in-game location-based services applied to a corresponding virtualized in-world map rendered to a display of the user's relevant gaming device. Once captured by the user, these digital assets or collectables may be stored, powered up, traded, gifted, ported to another game platform, or disposed of by the user.

Features provided in implementations can include, but are not limited to, one or more of the following items: (a) associating digital assets with other assets, such as associating collectible assets with music assets; (b) associating digital assets with virtualized in-game world geolocation or virtualized in-game world coordinate information, such as associating a collectible asset with a specific virtualized in-game location (e.g., virtualized in-world GPS coordinates); (c) managing the status of a digital asset based on virtualized in-game world geolocation or virtualized in-game world coordinate information, such as marking a collectible asset as collected for a user account when the virtualized in-game world geolocation or virtualized in-game world coordinate of a relevant gaming device player character (e.g., player avatar) that is registered to the user account matches the virtualized in-game world geolocation or virtualized in-game world coordinate information of the collectible asset; and (d) accessing a content asset based on the status of a collectible asset, such as allowing a user account to access a music asset (e.g., play a song) when a collectible asset associated with the music asset is marked as collected for the user account. Therefore, in the new system, computer systems interact to provide access to digital assets, such as music, based on user actions, such as going to particular virtualized in-game world geolocations or virtualized in-game world coordinates.

In one example, a user can listen to a song by visiting a virtualized in-game world geolocation or virtualized in-game world coordinate. A network server system includes a music database that stores music assets. The music assets include songs stored as digital data or files and have associated identifiers. The server system also includes a collectible database that stores collectible assets. The collectible assets are in database records that include information indicating an identifier and type of the collectible asset, a music asset associated with the collectible asset, a representation for the collectible asset (e.g., in image file), and a virtualized in-game world geolocation or virtualized in-game world coordinate of the collectible asset (e.g., virtualized in-game GPS data for a virtualized geolocation in the game world geography). The server system also includes a user account database storing user account information for users of the system. The user account information for a user indicates an identifier for the user (e.g., an email address, the relevant gaming device user login credentials, or a mobile device number) and a list of identifiers of collectible assets that the user has collected.

In one implementation, as a user using a relevant gaming device moves their in-game character/avatar (e.g., walks along an in-game virtual street), an application on the relevant gaming device contacts the server system and provides user information and user in-game virtual geolocation or in-game virtual coordinate information to the server system. The server system checks the collectible database to determine if there is a collectible asset at or near the in-game virtual geolocation or in-game virtual coordinate of the in-game user by comparing the in-game virtual geolocation or in-game virtual coordinate information of collectible assets with the user in-game virtual geolocation or in-game virtual coordinate information. If there is at least one collectible asset at or near the user in-game virtual geolocation or in-game virtual coordinate, the application causes the relevant gaming device to display indication(s) of the collectible asset(s) by showing the type(s) and representation(s) of the collectible asset(s). If the user indicates to the application to collect the collectible asset(s) (e.g., by selecting the asset(s) in the user interface of the relevant gaming device, such as by tapping on the representations), the application sends a collect request to the server system.

In one implementation, the server system updates the user record to add the collectible asset identifier(s) to the list of collected asset(s) of the user record. The application indicates to the user the music asset(s) associated with the collectible asset(s). If the user selects the music asset(s) through the application and requests to access the music asset(s), the application sends an access request to the server system. The server system accesses the data for the music asset(s) and provides access to the data to the application and relevant gaming device (e.g., by streaming the data to the relevant gaming device for audio playback through the application and relevant gaming device).

The above-described implementation is just one example of a server system providing access to content items. Additional variations and implementations are also possible. Examples include, alone and in combination, and are not limited to: (a) content assets including assets such as music, songs, albums, playlists of songs, videos, programs, movies, games, virtual reality (VR) experiences, digital items in other systems (such as clothing or furniture in a virtual environment or game); (b) collectible assets having representations related to the content assets, such as an album cover or artist image, or images, video, or audio captured and imported by a user (e.g., using a relevant gaming device camera); (c) multiple collectible assets associated with the same content asset and a collectible asset can be associated with multiple content assets; (d) assets collected in various ways or combinations of ways, such as completing actions, being at an in-game virtual geolocation or in-game virtual coordinate, spending an amount of time at an in-game virtual geolocation or in-game virtual coordinate, being at an in-game virtual geolocation or in-game virtual coordinate under set conditions (e.g., time, weather, or temperature), performing actions at an in-game virtual geolocation or in-game virtual coordinate digitally (e.g., playing a game, such as performing or competing with oneself or other users in music activities like singing, dancing, rapping, playing instruments, non-music activities like answering information or trivia questions, or other game mechanics), viewing or listening to content or advertisements; (e) accessing a collected asset requiring an action, condition, or fee (e.g., in real currency, digital currency, points or other environment or game parameters); (f) creating representations of collected assets, such as an image representation of a shelf or bin containing record albums for collected songs; (g) sharing information about collections with other users, such as sending images or information about a user's collection or experience (screenshots or environment image captures like "selfies") to other system (e.g., social media or communication platforms); (h) sharing content with other users, such as loaning or renting songs or albums to other users, or allowing other users to play a user's collected songs while the other users are visiting a virtual location of the user (e.g., a virtual room or house); (i) communicating with other users, such as based on common aspects of collections; (j) using augmented reality (AR) for representations of content assets, collectible assets, or other indicators for the system (e.g., an AR arrow in a mobile UI to show which direction to go to find a collectible asset); (k) using collectible assets in other applications or systems as well, such as within a VR environment, a game or shopping experience; (l) combining collectible assets and content assets, such as into collections, packages, or playlists, and shared, optionally with conditions; (m) trading, exchanging, converting, lending, renting, or selling collectible assets and content assets for other assets or privileges; (n) users collecting points or environment currency, and associated titles or other environment privileges from accumulated score; (o) a map user interface displaying in-game virtual geolocations or in-game virtual coordinates of collectible assets, such as showing images or icons at in-game virtual geolocations or in-game virtual coordinates on a map of the in-game world (e.g., displaying an album cover at the virtual map in-game virtual geolocation or in-game virtual coordinate where the collectible asset for a corresponding music asset in the shown album can be collected), or interactive indicators accessing for additional information such as where collectible assets can be found; (p) collectible asset representations and images are still or animated, showing objects that are fixed, moving, or changing or transforming, such as images of people or faces, or animated icons of people moving (e.g., an animated head of an artist singing, corresponding to the song of the collectible, such as actual artist images or generic types, drummers, heavy metal singers, punk guitar player, etc.); (q) collectible assets are interactive representations or operation, such as an animated person that asks and responds to questions, an animated guitar that plays notes based on user input, an animated person that asks for something from a user and animated to receive the object (e.g., virtual currency or objects, such as objects representing a music contract, first gig, introduction to agent, money, fame), an animated object that must be caught by tapping in a UI or chasing by changing in-game virtual geolocation or in-game virtual coordinate. An example of one implementation of a digital asset collection and management system is discussed below.

In one example implementation, a music-themed "scavenger hunt" game is disclosed. The game is a proprietary, affordable, robust, secure, adaptable, scalable, and entertaining game that allows the users to discover, track, and capture limited and unlimited supply and digital music and digital non-music assets in the virtual in-game world. The game utilizes virtualized in-game location-based services applied to an in-game virtual world map rendered to a display of the user's relevant gaming device. Once captured by the user, these digital collectables may be stored, powered up, traded, gifted, and/or ported to another game platform, or disposed of by the user.

In one implementation, the music-themed relevant gaming device game collects music-related digital artifacts including virtualized songs (e.g., singles) and albums (e.g., collections of songs). In the game, collections take place in an in-game virtual geolocation or in-game virtual coordinate map accessible from the relevant gaming device. Users walk around the virtual in-game world environments to find the hidden collectable songs and albums, and once found, the digital asset items are tracked and captured on the relevant gaming device. Further, the user collects the digitized asset of the song or album by simply tapping on the image of the song or album shown on the display of the relevant gaming device, or by tapping on the image of the song or album and performing additional task(s) (e.g., skill based, luck based), such as answering a trivia question(s), performing a physical task on the display of the relevant gaming device (e.g., throwing an object), solving a visual puzzle, or some other analogous task. If the completed task is performed satisfactorily, the digital collectable asset is "captured" by the user and added to the user's collection. The process of storing the collections includes depositing the song or album asset into one or more virtual structures (e.g., a vault, a music listening room, etc.).

In one implementation, the collected (or "captured") items are stored in the user's own personal record store that the user can visit anytime to admire the personal collections. The record store is also a gathering place for game players (all players or a subset such as within a pre-determined geo-fenced area of perhaps 10 real-world miles of the user), where such other players may gather around certain record bins arranged by genre (e.g., rock, pop, hip-hop, jazz, country) and interact with others with similar musical interests and tastes.

In one implementation, in addition to the songs and albums, the game supports collection of other music and non-music themed digital asset collectables including: (a) volumetric captures of an artist singing a song; (b) special artist artwork, album art, artist interviews; (c) 2-D videos of songs (e.g., MTV classics); (d) a digital representation of a physical item (e.g., clothing, car, piece of art) associated with the artist; and (d) any other digital asset (e.g., sports, TV, film, history, merchandise themed assets) that may or may not be music themed, but will be of relevance to the players in the game and worthy of collection. Further, some collectables are only found at certain times and virtual places. For example, some collectables appear: in parts of the virtual world that are stylistically associated with an artist and their songs; in and around a virtual concert venue on the week of a big virtual concert; only when the in-game virtual geolocations or in-game virtual coordinates where the game is being played has certain music playing in the background to prompt the appearance of certain music themed assets.

In one implementation, the digital assets collected within the game are also capable of being ported to other associated games (e.g., to be placed on display in a VR Music World game that is associated with the scavenger hunt non-VR PC game). In another implementation, the songs and albums are played within the game (with a per play fee being charged to the user for such play). In another implementation, the user collected songs are deposited into a "mix tape" to be played within the music-themed "scavenger hunt" game, and also to be played within any associated platform (e.g., ported into a VR Music World game). In another implementation, the music-themed "scavenger hunt" game allows users who have collected the same songs or albums to communicate with each other (e.g., social discovery) if the parties consent in advance to such interactions. In another implementation, some collected digital assets are aggregated and "traded in" for more rare assets (e.g., 12 songs to get one album), in the course of a normal gameplay. In another implementation, some collected digital assets are exchanged for physical merchandise (e.g., real world concert shirts) or services (e.g., real world concert tickets). In another implementation, some collected digital assets are traded or exchanged with others in the game, and in the process the administrator of the music-themed "scavenger hunt" game may collect valuable user data pertaining to tastes and preferences that may be monetized elsewhere. In another implementation, the music-themed "scavenger hunt" game presents advertisements to users in the course of gameplay and reward the users with extra points, digital collectables, abilities, or analogous items of value. In another implementation, the users accumulate points that may be used to assess their performance with other peers playing the game. In another implementation, photos of digital assets tracked and/or collected are forwarded from the game to the user's external social media or other communications channels. In another implementation, the music-themed "scavenger hunt" game is enabled to use the relevant gaming device camera for photography and/or photogrammetry to scan items such as music art, artist and song memorabilia, and other real-world items and convert the items into 3-D art models for user generated content assets that may be imported into the game for other players.

In a further implementation, the music-themed "scavenger hunt" game leverages the market's love of music and fascination with digital collectables including: structuring endless music-themed scavenger hunt themed weekends, holidays, seasons, and analogous events where certain songs, bands, genres are more available for a short period of time or in certain in-world virtual locations; and creatively capturing and storing metaphors borrowing from the music industry (pull a song asset into a virtual MP3 player, lasso a virtual vinyl record with headphones and cord, store captured music assets in playlists that may be shared or exported to Spotify, etc.). In another implementation, the music-themed "scavenger hunt" game makes use of tried and true scavenger hunt engagement techniques including: dropping music-themed virtual lures (tickets, groupies, live shows); sharing or exporting the captured music assets to third-party playlists, social media (e.g., AR enhanced); assembling global teams of Rock, Hip-Hop, Classical, Country, Gospel, and/or Pop; and enabling to add, evolve, and/or power-up a user's collection of music assets that may be showcased to others (asset collection cases, badges for complete sets, collect 12 singles and evolve into complete album, catching rare mixes, etc.).

In a further implementation, the music-themed "scavenger hunt" game incorporates in-game virtualized augmented-reality (AR) engagement mechanics including: an in-game virtualized location-based collection of music assets tied to music history metadata. In another implementation, a relevant gaming device includes special attributes to enhance a game offering (improving relations with users, broadband providers, and similar brands).

In a further implementation, the music-themed "scavenger hunt" game incorporates neurological reward engagement mechanics including: (a) integrating mature content in a more universally friendly manner through the collection of song; (b) offering endorphin loops for music collection by collecting items needed to catch music assets, successfully collecting a music asset, and "leveling up" a music asset (making it stronger/rarer); (c) enabling one user's collected song to "battle" another song based on pre-defined rules on chord structure, song length, historic Billboard ranking, etc.;

and (d) enabling one user's collected song to "battle" another song based on other game users' real time or recorded voting.

After reading above descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

FIG. 1 is a block diagram of a system 100 for managing access to digital content in accordance with one implementation of the present disclosure. In the illustrated implementation of FIG. 1, the system 100 includes a processor 120, a collectible database 130, a user account database 140, and a music database 150. The processor 120 is in communication with a relevant gaming device 110.

In one implementation, the collectible database 130 stores collectible records for collectible assets. A collectible record includes data indicating a collectible identifier, a collectible type, a music asset identifier for a music asset associated with the collectible asset, a representation for the collectible asset, and performance information of the collectible asset. In one implementation, the performance information is in-world virtualized geolocation or in-world virtualized coordinate information. In other implementations, the performance information includes at least one of completing actions, being at an in-world virtualized geolocation or in-world virtualized coordinate, spending an amount of time at an in-world virtualized geolocation or in-world virtualized coordinate, being at an in-world virtualized geolocation or in-world virtualized coordinate under set conditions (e.g., time, virtualized weather, or virtualized temperature), and performing actions at an in-world virtualized geolocation or in-world virtualized coordinate digitally (e.g., playing a game).

In one implementation, the user account database 140 stores user account records for users. A user account record includes data indicating an identifier for the user and a list of collectible identifiers of collectible assets that the user has collected.

In one implementation, the music database 150 stores music assets as music data representing songs and music asset identifiers for each music asset. In another implementation, the music database 150 also stores other media assets including at least one asset related to the music asset such as songs, albums, playlists, video, programs, movies, games, and virtual reality (VR) experiences.

In one implementation, the processor 120 is in communication with a relevant gaming device 110. Initially, the processor 120 receives an account identifier of the user and performance information of the collected collectible asset. The processor 120 then compares the received performance information with the performance information of the collectible asset in the collectible records of the collectible database 130. The processor 120 identifies a collectible record that has performance information matching the received performance information, and retrieves a collectible identifier for the identified collectible record.

In one implementation, the processor 120 also identifies a user account record (in the user account database 140) matching the user account identifier received from the relevant gaming device 110. The processor 120 then adds the retrieved collectible identifier (retrieved from the collectable database 130) to the identified user account record to indicate that the user account has collected the collectible asset associated with the retrieved collectible identifier. The processor 120 then retrieves a music asset identifier from the identified collectible record (in the collectible database 130), and sends a confirmation to the relevant gaming device 110 that indicates the collectible asset has been collected and indicates the retrieved music asset identifier. The processor 120 then receives a request from the relevant gaming device 110 to access a song represented by a music asset, where the request includes the retrieved music asset identifier. The processor 120 identifies a music asset in the music database 150 that corresponds to the retrieved music asset identifier, and sends the digital data for the identified music asset to the relevant gaming device 110 for playback of the song as audio.

Figure 2A:
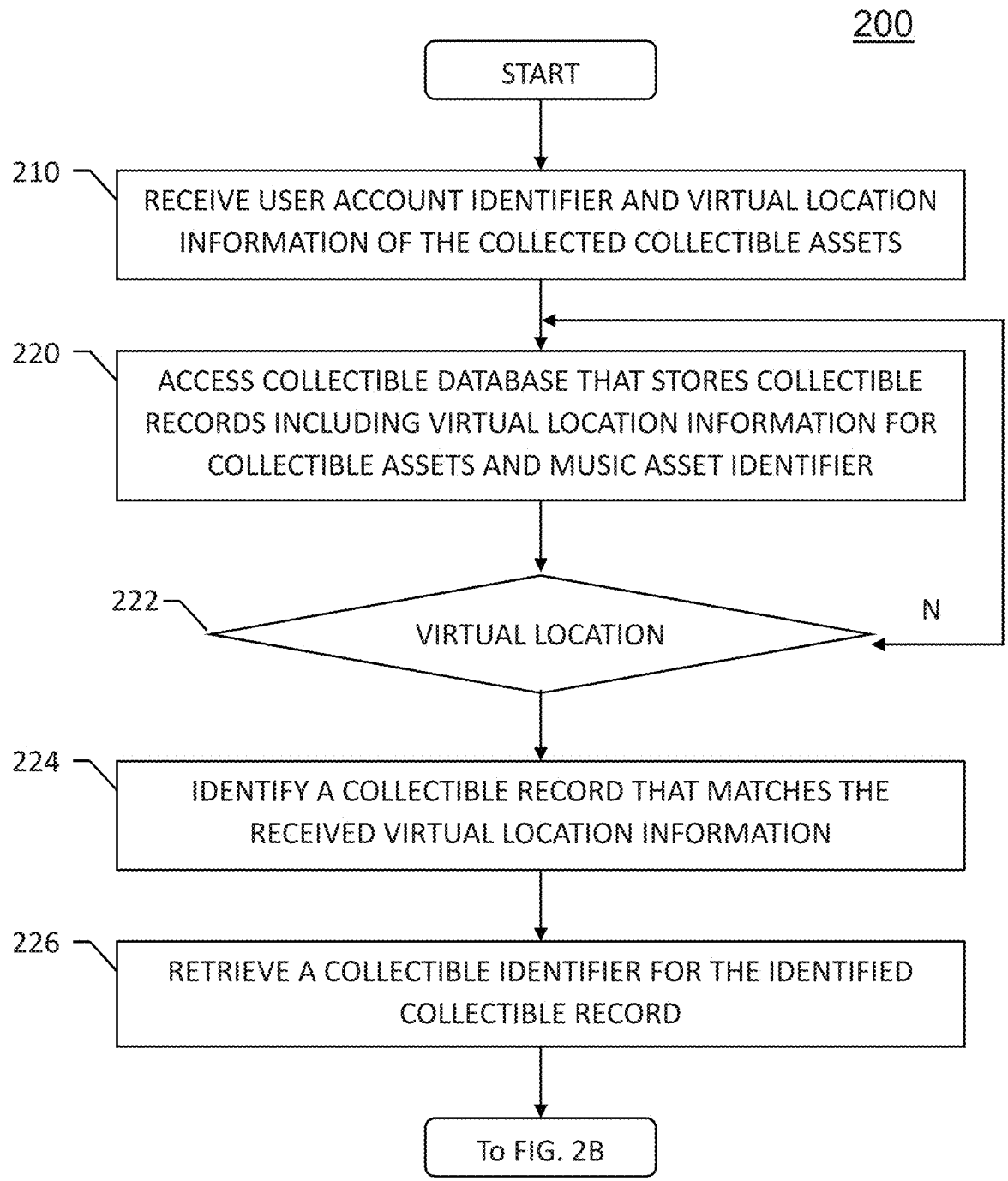
FIGS. 2A, 2B, and 2C form a flow diagram of a method for managing access to digital content at a server system in accordance with one implementation of the present disclosure.
Figure 2B:
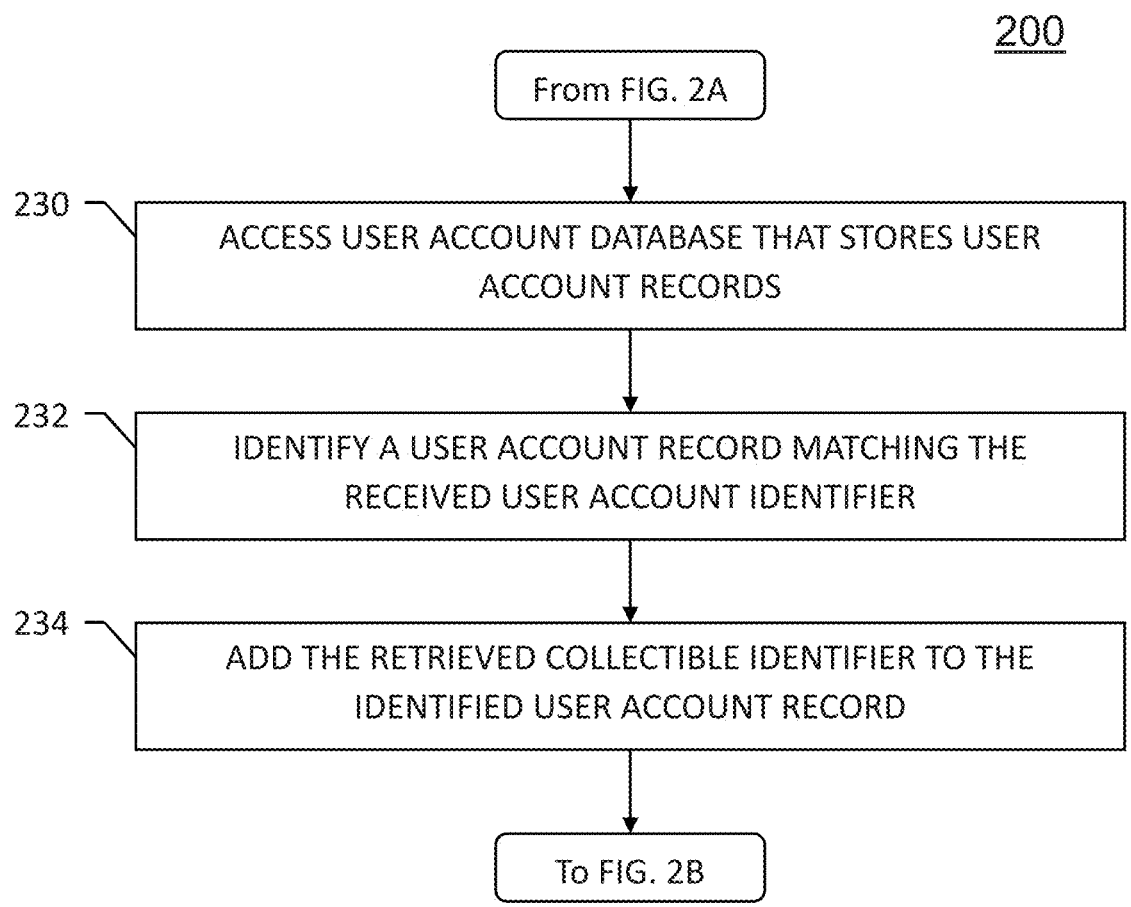
Figure 2C:
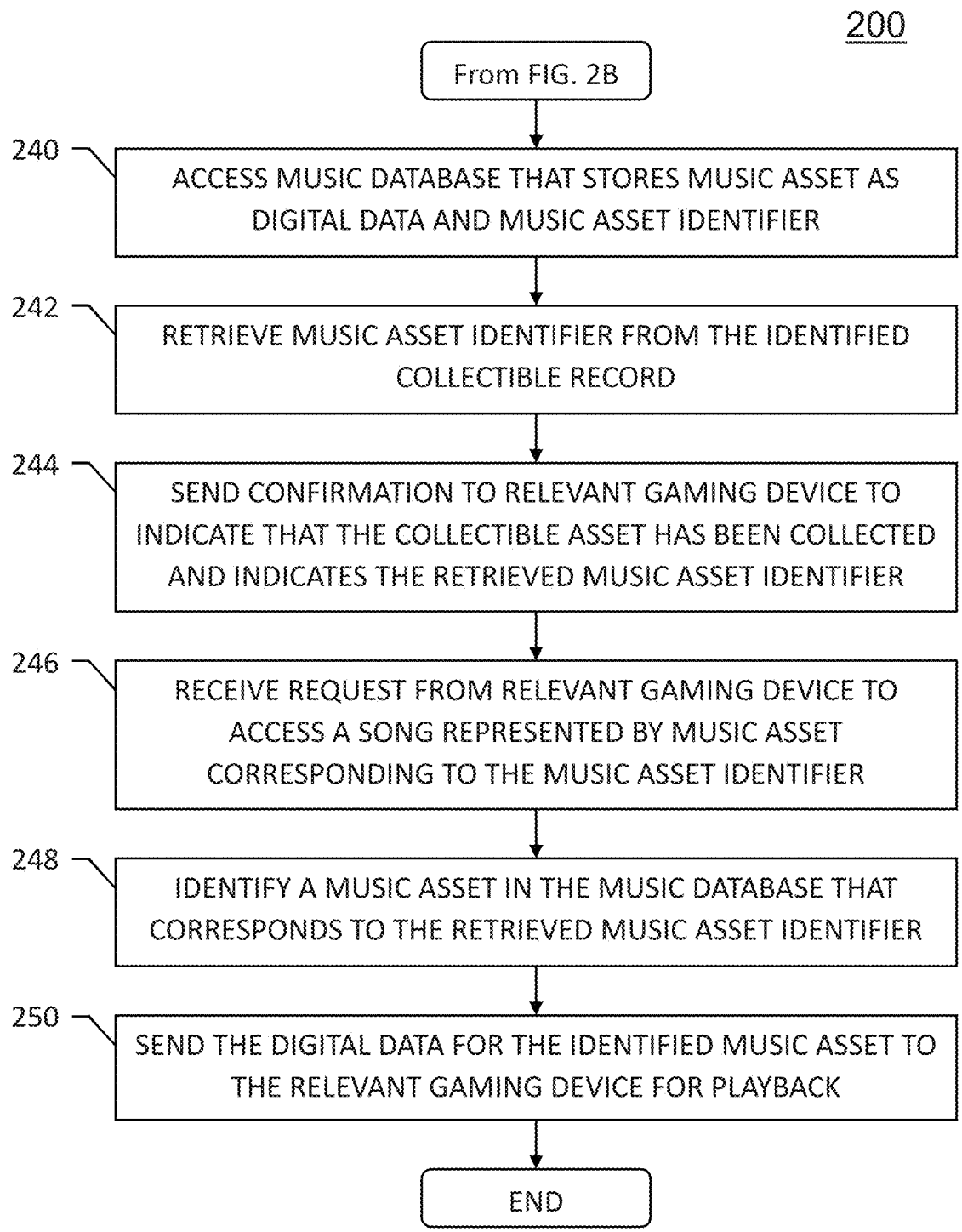

FIGS. 2A, 2B, and 2C form a flow diagram of a method 200 for managing access to digital content at a server system in accordance with one implementation of the present disclosure. In the illustrated implementation of FIG. 2, the method 200 includes receiving user account identifier and performance information of the collected collectible asset from a relevant gaming device, at block 210. In one implementation, the performance information is virtualized in-game location information. In other implementations, the performance information includes at least one of completing actions, being at a virtualized in-game geolocation, spending an amount of time at a virtualized in-game geolocation, being at a virtualized in-game geolocation under set conditions (e.g., virtualized time, virtualized weather, or virtualized temperature), and performing actions at a virtualized in-game geolocation digitally (e.g., playing a game).

In the illustrated implementation of FIG. 2, the method 200 also includes accessing a collectible database that stores collectible records, at block 220. The collectible records include performance information for collectible assets and music asset identifiers for music assets that correspond to the respective collectible records. The received performance information is then compared with performance information in the collectible records, at block 222. At block 224, a collectible record that has performance information matching the received performance information is identified. A collectible identifier for the identified collectible record is retrieved, at block 226.

In the illustrated implementation of FIG. 2, the method 200 also includes accessing a user account database that stores user account records, at block 230. The user account records include user account identifiers and collectible identifiers indicating collectible assets collected by a user account. A user account record matching the received user account identifier (from the relevant gaming device) is identified, at block 232. The retrieved collectible identifier (retrieved at block 226) is then added, at block 234, to the identified user account record (identified at block 232) to indicate that the user account has collected the collectible asset associated with the retrieved collectible identifier.

In the illustrated implementation of FIG. 2, the method 200 also includes accessing a music database that stores music assets as digital data and music asset identifiers that correspond to respective music assets, at block 240. A music asset identifier is then retrieved, at block 242, from the identified collectible record (identified in block 224), and a confirmation is sent, at block 244, to the relevant gaming device that indicates the collectible asset has been collected and indicates the retrieved music asset identifier. A request from the relevant gaming device to access a song represented by a music asset is received, at block 246, where the music asset corresponds to the retrieved music asset identifier. A music asset is identified, at block 248, in the music database that corresponds to the retrieved music asset identifier. At block 250, the digital data for the identified music asset is then sent to the relevant gaming device for playback of the song as audio by processing the sent digital data at the relevant gaming device.

Figure 3A:
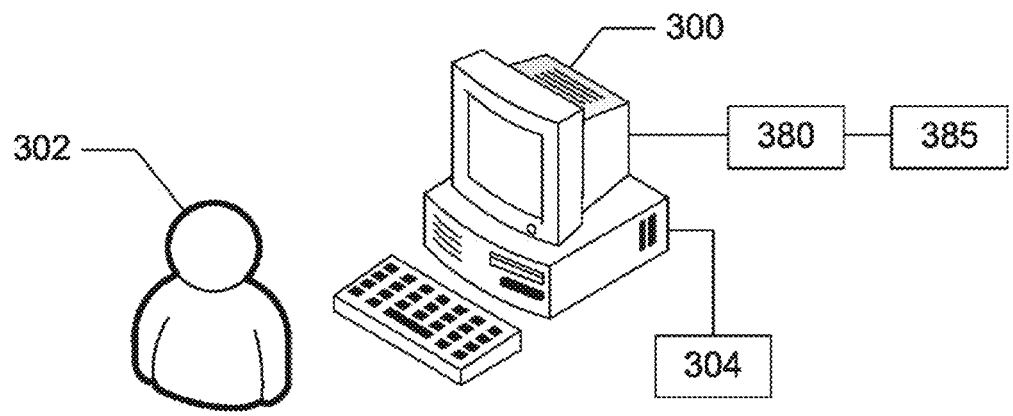
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement an asset managing application 390 as illustrated and described with respect to the system 100 of the block diagram shown in FIG. 1 and the method 200 illustrated in FIGS. 2A, 2B, and 2C.

Figure 3B:
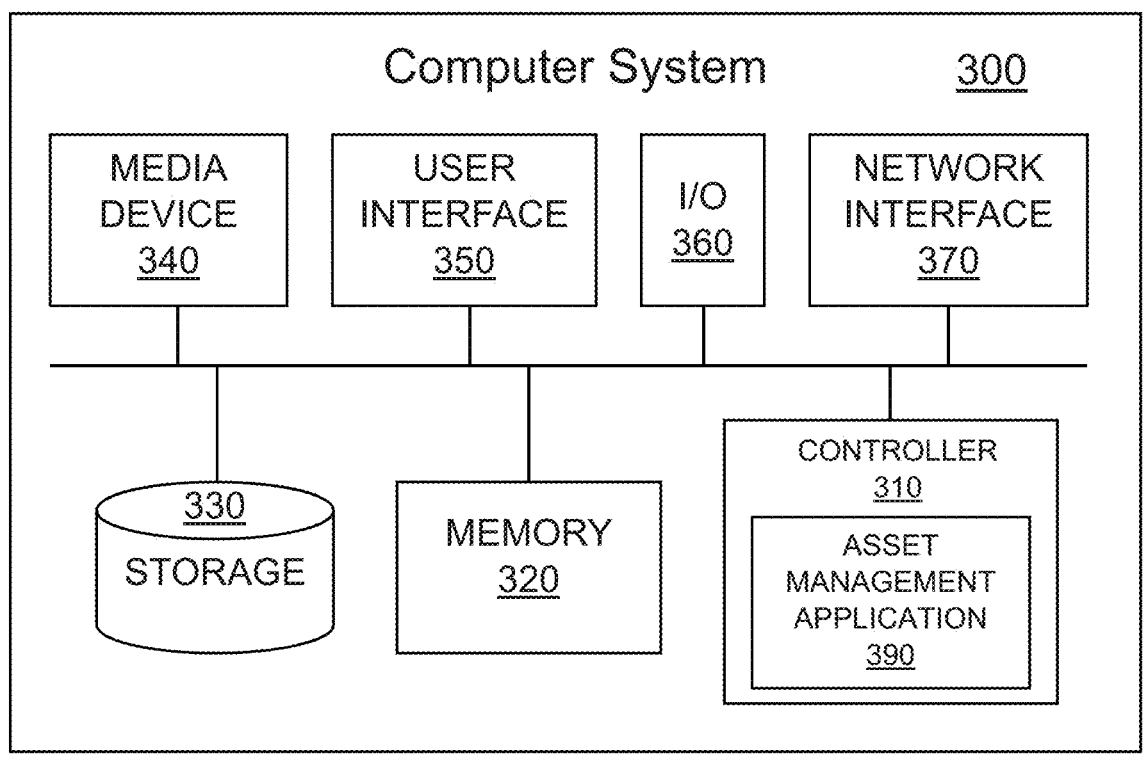
FIG. 3B is a functional block diagram illustrating the computer system hosting the asset managing application in accordance with an implementation of the present disclosure.

The computer system 300 stores and executes the asset managing application 390 of FIG. 3B. In addition, the computer system 300 may be in communication with a software program 304. Software program 304 may include the software code for the asset managing application 390. Software program 304 may be loaded on an external medium such as a CD, DVD, or a storage drive, as will be explained further below.

Furthermore, computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the asset managing application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the asset managing application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the asset managing application 390 with a software system, such as to enable the creation and configuration of engines and data extractors within the asset managing application 390. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the asset managing application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

In one implementation, the system 100 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the system 100 is configured with a combination of hardware and software.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system comprising:
one or more display devices,
a processor configured as a hardware device, and
one or more memory devices, the one or more memory devices storing computer-executable instructions which, when executed by the processor, cause the processor to:
manage and determine, by the processor, access to and collect digital content for a musically-themed digital asset collection game using virtualized in-game geolocation information including a real-world geo-fenced area for collectible assets based on output from a hardware gaming device;
store music assets as music data and music asset identifiers for each music asset, wherein the music assets include music-related assets;
store collectible records for collectible assets, wherein a collectible record includes data indicating a collectible identifier, a collectible type, a music asset identifier for a music asset associated with the collectible asset, a representation for the collectible asset, and the virtualized in-game geolocation information associated with the collectible asset;
store user account records for users, wherein a user account record includes data indicating an identifier for a user, and a list of collectible identifiers of collectible assets collected by the user;
receive a user account identifier and virtualized in-game geolocation information from the hardware gaming device;
compare, by the processor, the received virtualized in-game geolocation information with the virtualized in-game geolocation information in the collectible records;
identify, by the processor, a collectible record that has the virtualized in-game geolocation information matching the received virtualized in-game geolocation information;
retrieve, by the processor, a collectible identifier for the identified collectible record, to identify a user account record matching the received user account identifier;
add, by the processor, the retrieved collectible identifier to the identified user account record;

access, by the processor, a music database that stores music-related assets as digital data and music-related asset identifiers that correspond to respective music-related assets including a song,
wherein the virtualized in-game geolocation information enables a user to listen to the song by visiting a virtualized in-game world at the geolocation, and
wherein the processor enables the user to exchange the music-related assets for physical merchandises or services including real-world concert shirts or tickets using the virtualize in-game geolocation information with augmented reality to show direction to go to find the physical merchandises or services within the real-world geo-fenced area; and
enable, by the processor, to perform or compete with oneself or other users in music activities including singing, dancing, rapping, playing instruments, non-music activities including answering information or trivia questions, or other game mechanics.

2. The system of claim 1, wherein the music-related assets comprise songs, albums, playlists, video, programs, movies, games, and virtual reality (VR) experiences.

3. The system of claim 1, wherein the collectible identifier includes an image file.

4. The system of claim 1, wherein the identifier for the user includes at least one of an email address and a mobile device number.

5. A method performed on a hardware processor comprising:
managing and determining access to and collect digital content for a musically-themed digital asset collection game using virtualized in-game geolocation information including a real-world geo-fenced area for collectible assets based on output from a hardware gaming device;
receiving a user account identifier and the virtualized in-game geolocation information from the hardware gaming device;
accessing a collectible database storing collectible records including the virtualized in-game geolocation information for the collectible assets and music-related asset identifiers for music-related assets;
comparing the received virtualized in-game geolocation information with the virtualized in-game geolocation information in the collectible records;
identifying a collectible record that has virtualized in-game geolocation information matching the received virtualized in-game geolocation information;
retrieving a collectible identifier for the identified collectible record;
accessing a user account database that stores user account records including user account identifiers and collectible identifiers indicating collectible assets collected by a user account;
identifying a user account record matching the received user account identifier;
adding the retrieved collectible identifier to the identified user account record to indicate the user account has collected the collectible asset associated with the retrieved collectible identifier;
accessing a music database that stores music-related assets as digital data and music-related asset identifiers that correspond to respective music-related assets including a song,
wherein the virtualized in-game geolocation information enables a user to listen to the song by visiting a virtualized in-game world at the geolocation, and wherein the processor enables the user to exchange the music-related assets for physical merchandises or services including real-world concert shirts or tickets using the virtualize in-game geolocation information with augmented reality to show direction to go to find the physical merchandises or services within the real-world geo-fenced area;

enabling to perform or compete with oneself or other users in music activities including singing, dancing, rapping, playing instruments, non-music activities including answering information or trivia questions, or other game mechanics;

retrieving a music-related asset identifier from the identified collectible record; and sending a confirmation to the hardware gaming device that indicates the collectible asset has been collected and indicates the retrieved music-related asset identifier.

6. The method of claim 5, wherein the music-related assets comprise songs, albums, playlists, video, programs, movies, games, and VR experiences.

7. The method of claim 5, further comprising receiving a request from the hardware gaming device to access a song represented by a music-related asset, where the request includes the retrieved music-related asset identifier.

8. The method of claim 7, further comprising identifying the music-related asset in the music database that corresponds to the retrieved music asset identifier.

9. The method of claim 8, further comprising sending the digital data corresponding to the identified music-related asset to the hardware gaming device for playback of the song by processing the sent digital data at the hardware gaming device.

10. The method of claim 5, further comprising enabling the hardware gaming device to access the music-related asset when the confirmation is received by the hardware gaming device.

11. The method of claim 5, further comprising creating image representations of the collectible assets.

12. The method of claim 5, further comprising enabling the hardware gaming device to share information about the collectible assets.

13. The method of claim 12, wherein sharing information about the collectible assets includes sending images or information about an experience of collecting the collectible assets.

14. The method of claim 5, further comprising sending collecting points or environment currency, and associated titles or other environment privileges for collecting the collectible assets.

15. The method of claim 5, wherein the collectible assets include interactive representations with an animated objects or characters.

16. A non-transitory computer-readable storage medium storing executable instructions which, when executed by a hardware processor, cause the processor to:

manage and determine access to and collect digital content for a musically-themed digital asset collection game using virtualized in-game geolocation information for collectible assets based on output from a hardware gaming device;

receive a user account identifier and the virtualized in-game geolocation information including a real-world geo-fenced area from the hardware gaming device;

access a collectible database storing collectible records including the virtualized in-game geolocation information for collectible assets and music-related asset identifiers for music-related assets;

compare the received virtualized in-game geolocation information with the virtualized in-game geolocation information in the collectible records;

identify a collectible record that has virtualized in-game geolocation information matching the received virtualized in-game geolocation information;

retrieve a collectible identifier for the identified collectible record;

access a user account database that stores user account records including user account identifiers and collectible identifiers indicating collectible assets collected by a user account;

identify a user account record matching the received user account identifier;

add the retrieved collectible identifier to the identified user account record to indicate the user account has collected the collectible asset associated with the retrieved collectible identifier;

access a music database that stores music-related assets as digital data and music-related asset identifiers that correspond to respective music-related assets; retrieve a music-related asset identifier from the identified collectible record including a song, wherein the virtualized in-game geolocation information enables a user to listen to the song by visiting a virtualized in-game world at the geolocation, and wherein the processor enables the user to exchange the music-related assets for physical merchandises or services including real-world concert shirts or tickets using the virtualize in-game geolocation information with augmented reality to show direction to go to find the physical merchandises or services within the real-world geo-fenced area;

enable to perform or compete with oneself or other users in music activities including singing, dancing, rapping, playing instruments, non-music activities including answering information or trivia questions, or other game mechanics; and send a confirmation to the hardware gaming device that indicates the collectible asset has been collected and indicates the retrieved music-related asset identifier.

* * * * *